March 19, 1963 R. D. CHISHOLM 3,082,311
OVEN THERMOSTAT COOLING SYSTEM
Filed Oct. 23, 1961 2 Sheets-Sheet 1

INVENTOR.
ROY D. CHISHOLM
BY *Richard L. Caelin*
HIS ATTORNEY

March 19, 1963 R. D. CHISHOLM 3,082,311
OVEN THERMOSTAT COOLING SYSTEM
Filed Oct. 23, 1961 2 Sheets-Sheet 2
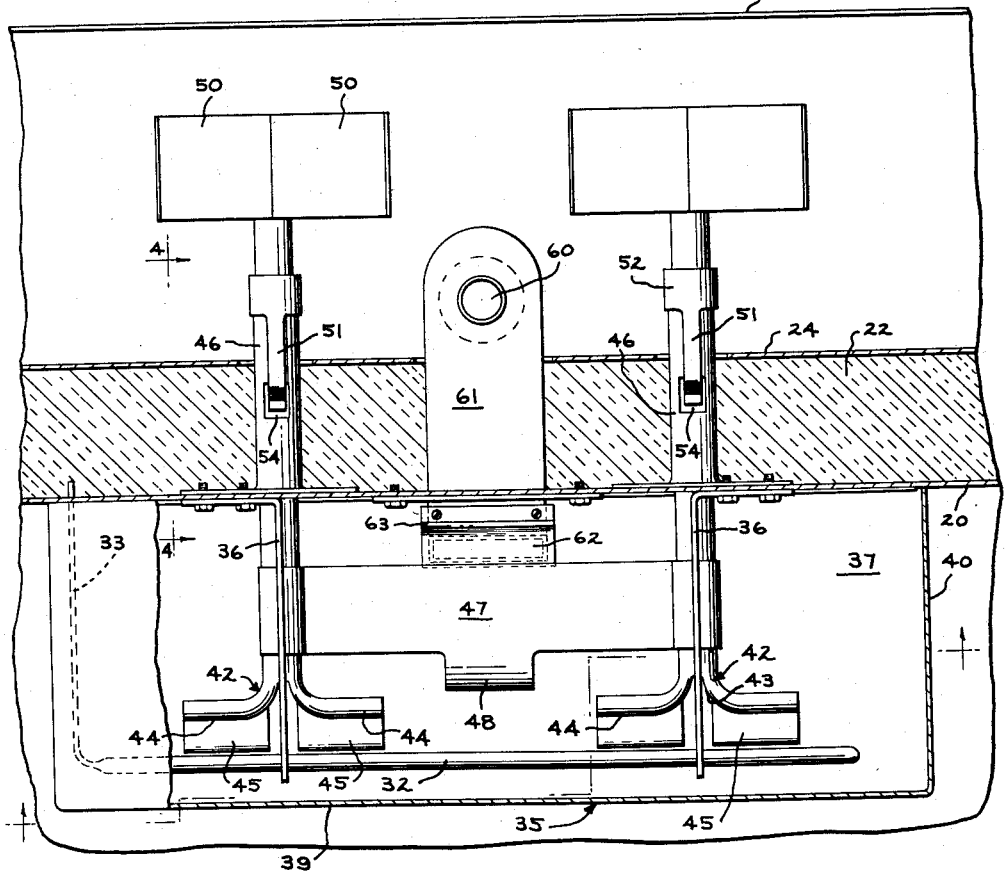
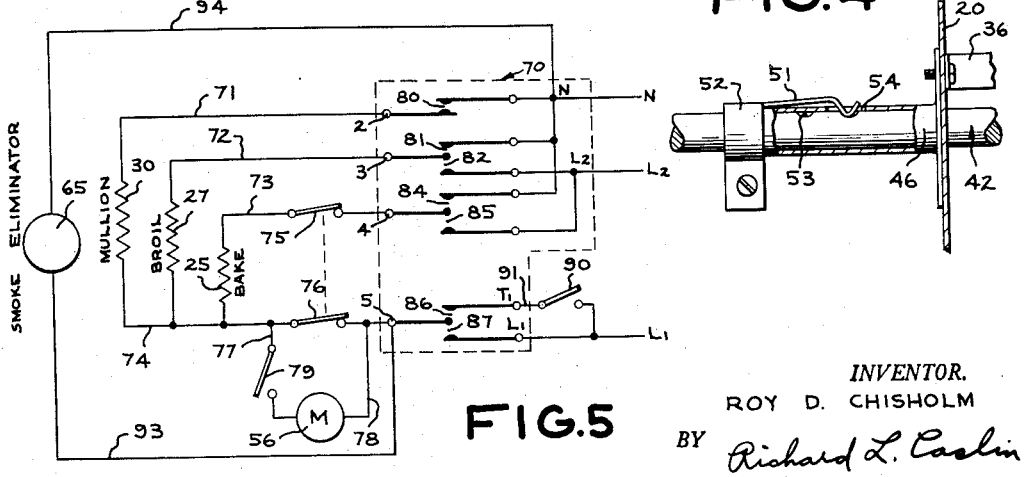
INVENTOR.
ROY D. CHISHOLM
BY Richard L. Caslin
HIS ATTORNEY

3,082,311
OVEN THERMOSTAT COOLING SYSTEM
Roy D. Chisholm, Louisville, Ky., assignor to General Electric Company, a corporation of New York
Filed Oct. 23, 1961, Ser. No. 146,997
8 Claims. (Cl. 219—35)

The present invention relates to high temperature domestic ovens and particularly to a means of protecting a fluid in a hydraulic thermostatic system to restrict the temperature of the fluid to a maximum temperature that is below the temperature at which the effectiveness of the fluid might be destroyed. Hydraulic thermostats having an elongated bulb or probe formed on the end of a capillary tube that is joined to a bellows or diaphragm within a thermostat housing have been widely used as oven thermostats for many years. The normal oven cooking temperatures have all been below about 550° F., and a thermally responsive fluid used in the hydraulic control system has been able to withstand this degree of temperature without difficulty, but the known thermally responsive fluids cannot be operated at temperatures much above this value.

In recent years a high temperature oven design has been developed which automatically cleans the food particles and grease spatterings from the inner walls of the oven cavity to free the housewife of the drudgery of washing, scrubbing, or scraping the spots of burned food soil that normally build up within the oven during the usual baking, broiling, and roasting operations. This novel oven design is capable of normal cooking operations and in addition has a high temperature heat cleaning cycle for raising the oven air temperature to a maximum temperature between about 750° F. and 950° F. so as to burn off all food soil and leave the inner walls of the oven cavity perfectly clean. This design is described and claimed in a co-pending application of Bohdan Hurko, Serial No. 27,926, filed May 9, 1960, and assigned to the General Electric Company, assignee of the present invention. This extreme high temperature raises a problem as to how to protect the fluid in the hydraulic thermostat so that a hydraulic thermostat can be used to advantage in a heat cleaning oven.

The principal object of the present invention is to provide a means for holding down the temperature of the bulb of a hydraulic thermostat in an oven while the oven air temperature rises much higher than the bulb temperature so that the bulb temperature is an analog of the oven air temperature, as well as means for cooling the bulb rapidly once the oven air temperature reaches its predetermined maximum temperature so that the maximum oven air temperature can be held substantially constant for a predetermined length of time.

A further object of the present invention is to provide a protective means for the bulb of a hydraulic thermostatic system in an oven where the protective means may be brought into action when the oven temperature is to be raised above the normal cooking temperatures by shielding the bulb from the oven cavity, dissipating some of the heat of the bulb outside of the oven, and forcing ambient air into the shield to cool the bulb rapidly once the maximum oven air temperature is reached for cycling the heating means of the oven with a small temperature differential so as to hold a substantially constant maximum oven air temperature for a predetermined length of time.

The present invention, in accordance with one form thereof, is incorporated in a domestic oven that has an oven cavity formed by a box-like oven liner and a front-opening door. Heating means are provided for supplying heat energy to the oven cavity both for normal cooking operations and for raising the temperature above the normal cooking temperatures during an automatic heat cleaning cycle. A hydraulic thermostatic control system is incorporated with the oven for sensing the oven temperature and limiting the maximum temperature within the oven cavity. Protective means have been furnished for the thermostat bulb during the heat cleaning cycle only. This protective means includes a movable shield for isolating the bulb from the oven air temperature, and a heat sink engageable with the bulb for drawing off some of the heat from the bulb and dissipating it outside the oven so that the bulb temperature is an analog of the oven air temperature. Room air is forced into the shield over the bulb for cooling down the bulb rapidly once the desired maximum oven air temperature has been reached and the heating means de-energized. This is done to prevent the bulb from becoming further heated by the relatively higher oven air temperature. Instead of this, the bulb is cooled so that it registers a lower temperature and signals the thermostat to again energize the heating means. This action of cycling the heating means off and on is continued for a predetermined length of time until it is terminated by a preset clock-timing device or other suitable means that is connected in the power circuit for the oven. Accordingly, it will be understood that it is possible to hold the maximum oven air temperature fairly constant so as to burn off the food soil from the walls of the oven liner in the least amount of time.

My invention will be better understood from the following description taken in connection with the accompanying drawings and its scope will be pointed out in the appended claims.

FIGURE 2 is a fragmentary top plan view taken on the line 2—2 of FIGURE 1 and showing many of the details of the shield over the bulb of the thermostat and the heat sinks engaging the bulb to draw off some of the heat therefrom and dissipate it outside of the oven;

FIGURE 4 is a detailed showing of the detent spring means taken on the line 4—4 of FIGURE 2 to depict the manner of locking the heat sinks in the retracted or engaged position with respect to the bulb of the thermostat; and FIGURE 5 is a typical circuit diagram used for controlling the energization of the oven heating elements.

Figure 1:
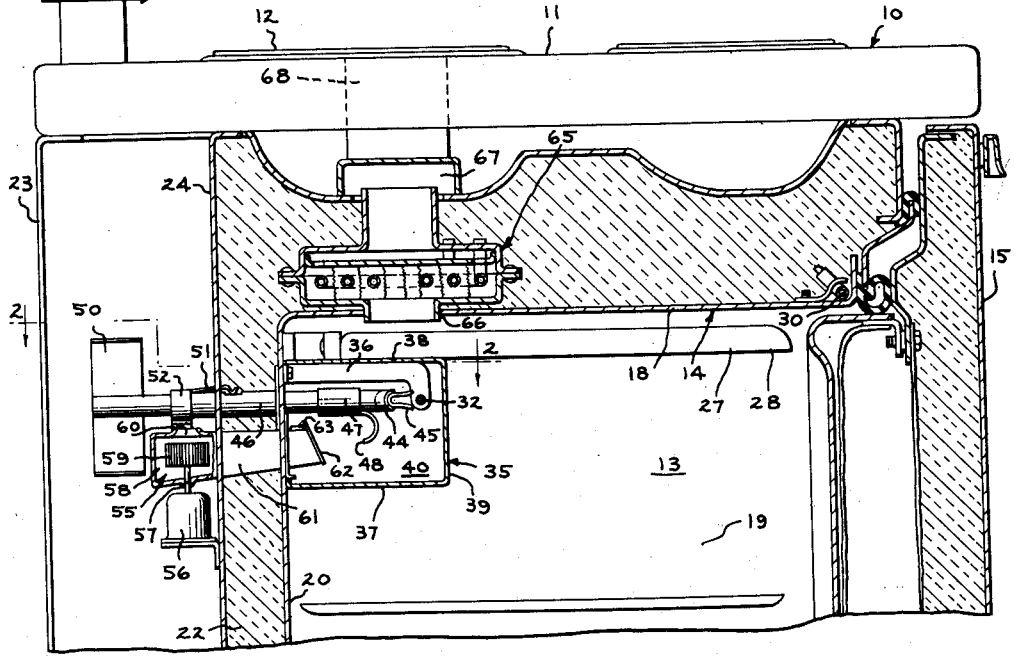
FIGURE 1 is a left side elevational view partly in cross-section showing the top portion of a domestic oven in an electric range designed to incorporate an automatic heat cleaning cycle of the present invention.
Figure 3:
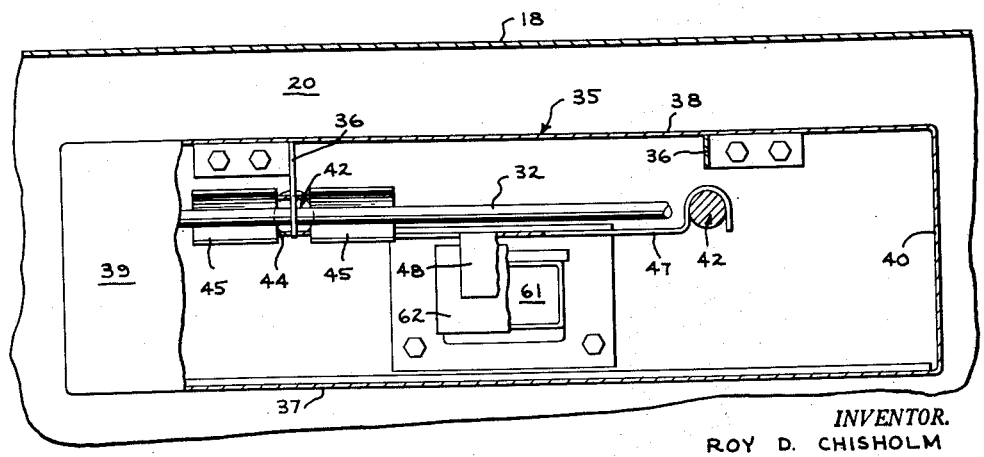
FIGURE 3 is a front elevational view of the shield over the thermostat bulb with parts broken away to show more of the details of the heat sinks and the air duct that communicates with the shield for forcing ambient air over the bulb once the oven air temperature has reached its maximum amount.

Turning now to a consideration of the drawings and in particular to FIGURE 1, there is shown one embodiment of this invention incorporated in a free-standing electric range 10 having a top cooking surface 11 with a plurality of surface heating elements 12 supported therein. Beneath the cooking surface 11 is an oven construction comprising an oven cavity 13 that is formed by a box-like oven liner 14 and a front-opening oven door 15. The back edge of the cooking surface 11 is provided with a backsplasher 16 that contains a control panel 17 having the various control components such as switches, thermostats and timers for controlling the energization of the various heating elements of the range. The box-like oven liner 14 has a top wall 18, opposite side walls 19, a back wall 20, and a bottom wall (not shown). Thermal insulation 22 such as fiber-glass or the like is packed around the outside of the oven liner 14, and a cabinet or body member 23 serves as the supporting structure for the various elements of the range, as well as providing a decorative porcelain enameled appearance in the kitchen.

A back panel 24 is arranged across the back of the oven inwardly of the back portion of the range so as to cover the insulation 22 and retain it in place as well as to define a wiring compartment that provides room for the various lead wires connecting the heating elements with the electrical controls.

Heating means must be provided for the oven for both normal cooking operations as well as for the automatic heat cleaning cycle. The oven liner 14 supports a pair of standard oven units; namely, a lower bake unit 25 (not shown except in the circuit diagram of FIGURE 5) supported adjacent the bottom wall of the oven liner, and an upper broil unit 27 supported adjacent the top wall 18 of the oven liner. Both of these bake and broil units are supported from the back wall 20 of the oven liner and an electrical connection extends through said wall for making a circuit connection therewith. As is standard practice, the broil unit 27 is provided with an overlying down-turned reflector 28 which is generally of pan shape to focus the heat from the broil unit toward the center of the oven cavity. Additional heat is needed for the oven during the heat cleaning cycle in the vicinity of the door 15. This is provided by a mullion heater 30 which is wrapped around the front portion of the oven liner in close proximity to the door 15. The mullion heater compensates for heat lost through and around the door so as to obtain substantially uniform oven wall temperatures and make it possible to clean all areas of the oven liner equally well as is discussed and claimed in the aforementioned Hurko application.

An oven thermostat (not shown) is located in the control panel 17 of the backsplasher 16 for controlling the energization of the bake unit 25 and broil unit 27 as well as the mullion heater 30 in the case of the heat cleaning cycle. It is necessary for the thermostat to have a sensing device within the oven cavity for determining the oven temperature and signaling this temperature to the thermostat which then acts upon this information and controls the temperature to the degree predetermined by the thermostat setting. Such a sensing device is represented by an elongated bulb 32 that is best shown in FIGURE 2 and extends outwardly from the back wall 20 of the oven liner and parallel therewith adjacent the top portion of the oven cavity. This bulb 32 is joined to the thermostat by a capillary tube 33. A temperature responsive fluid fills the blub and capillary tube for acting upon a bellows or diaphragm (not shown) within the thermostat. This thermostat may be of any suitable hydraulic type, but I prefer to use a thermostat of the general type disclosed in the United States patent to W. J. Ettinger, 2,260,014, dated October 21, 1941.

This fluid may be a phenyl di-phenyl chloride or any other similar high temperature compound being marketed today under various chemical trade names. The best fluids available today for use with a hydraulic thermostat cannot be relied upon at temperatures much above 600° F. because they start to chemically decompose and lose their important properties. Also, the copper bulb and capillary tube begin to shoften and oxidize at around 700° F. and this oxidation can continue for only a short time before the fluid will begin to leak and render the thermostat inoperative.

Several measures may be adopted for protecting the fluid in the bulb 32 during the heat cleaning cycle so that the bulb temperature will always remain below the maximum critical temperature and will be an analog of the oven air temperature. First there is a box-like cover 35 of polished aluminum that is supported over the bulb 32 for isolating the bulb from the oven air. A pair of supporting brackets 36 are fastened to the back wall 20 of the oven liner and extend outwardly therefrom for supporting at their innermost ends the bulb 32 which extends through a suitable opening in each bracket. The cover 35 has a bottom wall 37, top wall 38, front wall 39, and opposite side walls 40. Hence it will be understood that the back of the cover 35 is open and this allows the cover to be positioned over the bulb 32 with the top wall 38 of the cover resting upon the two supporting brackets 36 as is best seen in FIGURE 1. No effort is made to attach the cover 35 to the back wall 20 of the oven liner so that there is an imperfect seal purposely established between the interior of the cover and the oven cavity. However, it should be understood that under normal conditions the cover 35 will remain in place as shown in FIGURE 1 until it is removed by the housewife after the completion of the heat cleaning cycle.

In addition to the shielding or isolating of the thermostat bulb from the oven air it is deemed expedient to provide heat sinks 42 that are shown as two in number and are movable into engagement with a substantial portion of the bulb for drawing heat out of the bulb and dissipating the heat to the exterior of the oven. A preferred embodiment of the heat sinks 42 is formed of copper bars for high thermal conductivity which are chromium plated for low emissivity and are split as at 43 at their innermost ends and folded back in opposite directions to form a pair of seats 44 that each support a folded sheet of material 45 that serves as a fork member to slip over the bulb when the heat sinks are pulled into engagement with the bulb. Each heat sink 42 is supported and guided in a tubular member or sleeve 46 that is in turn supported on the back panel 24 of the range body and through an opening in the back wall 20 of the oven liner. A strap member 47 is fastened between the two heat sinks 42 and a down-turned handle portion 48 is provided for the strap for ease in grasping the strap and moving the heat sinks to their desired positions, either away from the bulb during normal cooking or in engagement with the bulb during the heat cleaning cycle. The outermost end of each heat sink 42 is likewise split vertically for receiving a pair of generally V-shaped fins 50 which are held in place with a force fit and serve as radiating means to receive the heat from the bulb 32 and transfer the heat to the room air flowing around the range and especially through the wiring compartment. As is best shown in FIGURE 4, a small detent spring 51 serves to hold each heat sink 42 against inadvertent movement. This is accomplished by attaching one end 52 of the detent spring 51 to the sleeve member 46 and providing each heat sink with a pair of detents 53. A suitable opening 54 is formed in the top of the sleeve 46 so that the distal end of the spring 51 may protrude therethrough and engage either one of the detents 53. This simple holding means has been found advantageous because it gives the housewife assurance that the heat sink is properly located because she can feel when the detent spring moves into and out of the detents 53. Otherwise, it is rather difficult to observe the position of the heat sinks because of the nearly hidden location of the heat sinks in the top portion of the back of the oven.

This combination of parts described above will allow the oven to rise to a temperature of about 900° F. with the thermostat set at the heat cleaning setting, that is comparable to the broil setting of about 550° F., before cycling occurs. However, it would be a long time before the bulb cools down enough to signal the thermostat for more heat because the high temperature within the oven of about 900° F. adds more heat to the bulb at about 600° F. so that the oven temperature must drop several hundred degrees before the thermostat is cooled enough to demand more heat. In fact the bulb increases in temperature some 40° F. after the power is turned off. In order to maintain an oven temperature in the cleaning range for a long enough period for thorough cleaning, a blower 55 is assembled within the wiring compartment and to the back panel 24 for forcing relatively cool air into the cover 35. This blower includes a small motor 56 having a shaft 57 extending into a blower housing 58 and having the blower wheel 59 supported on the end of the shaft within the housing. Air is drawn into the housing 58 through the top opening 60, and a duct 61 extends through the oven wall from the blower housing 58 to the interior of the cover 35. The innermost end of the duct is provided with a flapper 62 that is pivoted about its top edge 63 and is normally held closed by gravity. The blower motor 56 is connected into the heater circuit across the thermostat contacts so that the motor is shorted out when power is being delivered to the oven. Then when the thermostat cycles off as the oven air temperature reaches its predetermined maximum amount, the blower starts to blow cool air into the cover. This lowers the temperature of the bulb and causes thermostat to cycle on to again supply heat to the oven while automatically cutting the blower off. As this cycle is repeated an amplitude of less than 5° F. is obtained. The amount of air flow through the duct can be adjusted by limiting the opening of the flapper so that a constant average temperature can be maintained. The flapper 62 is adapted to be closed when the blower is off so as to prevent the escape of smoke, heat and odors from the oven.

Standard ovens are provided with vents to provide a certain amount of air flow through the oven, but this is particularly necessary during a heat cleaning cycle in the present invention because smoke is generated from the food soil and grease spatter that are being burned off the surfaces of the oven liner. Accordingly, the gases and water vapor created in the oven cavity are discharged through a top vent in the form of a smoke eliminator 65 such as an electric catalytic smoke eliminator of the general type disclosed in the United States patent to Stanley B. Welch, No. 2,900,483, dated August 18, 1959, which is assigned to the General Electric Company, the same assignee as in the present invention. This smoke eliminator 65 is mounted in an opening 66 in the top wall 18 of the oven liner. An exhaust duct 67 is positioned over the smoke eliminator and extends laterally under the cooking surface 11 with a vertical extension 68 that rises to the underside of one of the surface heating elements 12 through which it exhausts. It will be understood that the vertical extension 68 is offset from the smoke eliminator 65 so as to avoid the spillage of fluids directly into the smoke eliminator when cooking on the surface units 12. Because of an imperfect seal between the cover 35 and the oven liner 14 the relatively cool air forced into the cover by the blower 55 passes through and out of the cover and is exhausted through the smoke eliminator 65.

Turning now to a consideration of the circuit diagram of FIGURE 5 there is shown the broil unit 27, the bake unit 25, and the mullion heater 30. There is a multiple pushbutton switch 70 of the general type shown in the patent of Philip Hutt, 2,819,356, dated January 7, 1958, and which is assigned to the General Electric Company the assignee of the present invention. The mullion heater 30 is connected to switch terminal 2 by means of lead 71. The broil unit 27 is connected to switch terminal 3 by means of leads 72, and the bake unit 25 is connected to the switch terminal 4 by means of leads 73. All three heating elements 25, 27, and 30 are connected by lead 74 to switch terminal 5. The thermostat (not shown) has a pair of normally closed contacts which are connected in the leads 73 and 74 between the bake unit 25 and the switch terminals 4 and 5. One such pair of thermostat contacts is identified as element 75 in lead 73, while the other thermostat contacts are identified as element 76 in lead 74. The blower motor 56 is shunted across the thermostat contacts 76 by means of leads 77 and 78. Normally open contacts 79 are located in the lead 77 so that the blower motor does not operate during normal cooking operations. These contacts 79 are closed by a door latching mechanism (not shown). In order to prepare the oven for a heat cleaning cycle it is necessary to latch the oven door 15 and this latching operation automatically closes the contacts 79 thereby connecting the blower motor across the thermostat contacts 76. The switch 70 is connected to a single phase 230 volt alternating current three wire power source where the wires are identified as line wires L1 and L2 and neutral wire N. These wires are connected to three terminals of the switch that are also identified L1, L2 and N. The switch contains a plurality of switch contacts identified as contacts 80 between switch terminals N and 2, contacts 81 between switch terminals N and 3, and switch contacts 82 between switch terminals L2 and 3, switch contacts 84 between switch terminals N and 4, and switch contacts 85 between switch terminals L2 and 4, switch contact 86 between switch terminals T1 and 5, and switch contacts 87 between switch terminals L1 and 5. The smoke eliminator 65 is shown connected by lead 93 to switch terminal 5 and by lead 94 back to the neutral wire N. Thus during a heat cleaning cycle the smoke eliminator is connected across wires L1 and N. It should be understood that for the sake of simplicity many auxiliary components for the oven such as pilot lights, indicator lights, cooling fans, etc., are not shown on this circuit diagram, nor are the contacts of the switch 70 for controlling these elements shown since they would not contribute to the understanding of the present invention.

For a normal cooking operation such as baking, the bake unit 25 is operated at 236 volts across lines L1 and L2 and at the same time the broil unit 27 is connected across 118 volts from line L1 to neutral N. The circuit for the bake unit may be traced from line L2 through switch contacts 85, switch terminal 4, thermostat contacts 75, lead 73, to bake unit 25, and then by lead 74 through thermostat contacts 76, switch terminal 5, switch contacts 87 to line L1. At the same time the broil unit 27 is connected in a completed circuit from neutral N through switch contacts 81, switch terminal 3, lead 72, to broil unit 27, and then to lead 74, and thermostat contacts 76, to switch terminal 5, switch contacts 87 to line L1.

The broiling operation connects the broil unit 27 across the two lines L1 and L2 at 236 volts. The circuit may be traced as follows: line L2 through switch contacts 82, switch terminal 3, lead 72, to broil unit 27, and then to lead 74, thermostat contact 76, to switch terminal 5, and through switch contacts 87 to line L1.

During the heat cleaning cycle all three heating elements, the bake unit 25, the broil unit 27, and the mullion heater 30 are connected in parallel across 118 volts of line L1 and neutral wire N. This circuit may be traced as follows: from neutral wire N, through switch contact 80, switch terminal 2, lead 71, to mullion heater 30, and then through lead 74, thermostat contacts 76 to switch terminal 5, through switch contact 86 to switch terminal T1 to which a pair of timer contacts 90 are connected by means of lead 91 to line L1. The purpose of the timer contacts 90 is to be able to set the amount of time the heat cleaning cycle will be allowed to operate, which at the present time is considered to be about two and one-half hours. About one hour is considered necessary to bring the temperature up to the maximum oven air temperature of betyeen 750° F. and 950° F., and it is contemplated that the oven temperature will remain substantially constant for the remaining one and one-half hours at this maximum temperature. The circuit for the broil unit is from neutral wire N through switch contacts 81, switch terminal 3, lead 72, to broil unit 27, and then through lead 74, thermostat contacts 76 to switch terminal 5, switch contacts 86 to switch terminal T1 and then through lead 91 through timer contacts 90 to line L1. Lastly, the circuit for the bake unit is from neutral wire N through switch contacts 84, switch terminal 4, thermostat contacts 75, lead 73, to bake unit 25, and then through lead 74, thermostat contacts 76 to switch terminal 5, switch contacts 86 to switch terminal T1 and then through lead 91 and timer contacts 90 to line L1.

It will be understood that when the thermostat contacts 75 and 76 are closed no current flows through the blower motor 56 because the contacts short the motor windings. However, when the oven air temperature reaches the maximum temperature set by the thermostat, the thermostat contacts 75 and 76 will cycle open thereby de-energizing the heating elements 25, 27 and 30 and causing current to flow through leads 77 and 78 to the blower motor 56. Because of the relatively high resistance and small current flowing through the motor 56 little current flows through the heating elements 27 and 30 so that they remain substantially de-energized. Bake unit 25 is completely de-energized by the thermostat contacts 75 being open.

Having described above my invention of a novel means of protecting the bulb of a hydraulic thermostat it will readily be apparent to those skilled in this art that it is well to provide some means for continuing the operation of the blower after the cleaning cycle has been completed so that the heat stored in the oven cannot raise the bulb temperature where either or both the fluid and the copper bulb may be damaged. Such a means could be a time delay relay that would be energized when the circuit is completed for the heat cleaning cycle. Such a relay could control a thermal relay that is automatically resettable once the oven is inoperative and has cooled down.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A domestic oven having an oven cavity formed by a box-like oven liner and a front opening door, heating means for supplying heat to the cavity, a hydraulic thermostatic control system for governing the said heating means, said control system including a thermostat bulb located within the oven cavity, a temperature responsive fluid filling said bulb for controlling said heating means as a function of the expansion and contraction of the fluid; the invention comprising a protective means for preventing an excess temperature rise in said bulb, said protective means including a shield disposed over the bulb to isolate the bulb from the oven cavity, a heat sink means extending through one wall of the oven and engageable with the bulb along a portion of the length thereof for drawing heat away from the bulb by conduction and radiation and expelling it externally of the oven, there being a large temperature differential between the high temperatures within the oven cavity and the relatively low temperature of the bulb within the shield, the heating means being de-energized when the oven temperature approaches a predetermined maximum value, an air duct extending through the oven wall and communicating within the said shield, and blower means for moving ambient air through the duct and into the shield for cooling the bulb, said blower means being energized when the heating means is de-energized so as to quickly cool down the thermostat bulb and cause the cycling of the heating means before the temperature in the oven cavity drops appreciably to hold a substantially constant maximum oven temperature for a predetermined length of time.

2. A domestic oven having an oven cavity formed by a box-like oven liner and a front opening door, heating means for supplying heat to the cavity, a hydraulic thermostatic control system for controlling the temperature within the oven cavity, said control system including a thermostat bulb located within the oven cavity, a temperature responsive fluid filling said bulb for controlling said heating means as a function of the expansion and contraction of the fluid; the invention comprising a means for protecting the bulb and preventing an excess temperature rise in said fluid, said protective means including a shield disposed over the bulb to isolate the bulb from the oven cavity, a thermal conducting element extending through one wall of the oven and engageable with the bulb for drawing heat away from the bulb and expelling it externally of the oven so that the temperature of the bulb is in analog of the temperature within the oven cavity and is substantially lower than the oven temperature, the control system serving to de-energize the heating means when the oven temperature approaches a predetermined maximum value, an air duct extending through one of the oven walls and communicating with the said shield, and a blower means cooperating with the duct for forcing ambient air into the shield once the heating means is de-energized as the temperature approaches its predetermined maximum value for cooling the bulb so as to quickly cool down the thermostat bulb and cause the cycling on of the heating means before the temperature in the oven cavity drops appreciably thereby holding a substantially constant maximum oven temperature for a predetermined length of time.

3. A domestic oven as recited in claim 2 wherein for normal cooking operations the shield is removed from over the bulb so that the bulb is exposed within the oven cavity, the thermal conducting element also being separated from the thermostat bulb during normal cooking operations so that the bulb will accurately sense the oven air temperature.

4. A domestic oven as recited in claim 3 wherein the air duct includes a damper that is closed when the blower means is deenergized so as to prevent the escape of heat and gases from the oven.

5. A domestic oven having an oven cavity formed by a box-like oven liner and an access door, heating means for supplying heat to the cavity, a hydraulic thermostatic control system for sensing the oven air temperature and governing the energization of the heating means, said control system including a thermostat bulb located within the oven cavity, a temperature responsive fluid filling said bulb and serving as the control medium to the expansion and contraction characteristics of the fluid, the heating means being capable of raising the oven air temperature above the normal cooking temperatures to a vicinity of between 750° F. and 950° F.; the invention comprising a protective means for the bulb to prevent an excess temperature rise in the fluid, said protective means including a movable shield that may be disposed over the bulb to isolate the bulb from the oven cavity, a heat conducting means extending through one wall of the oven and engageable with the bulb along a portion of the length thereof for removing heat from the bulb and expelling the heat externally of the oven, whereby the temperatures within the oven cavity are relatively higher than the temperature of the thermostat bulb due to the protective means for the bulb, so that when the oven temperature reaches the predetermined maximum of between 750° F. and 950° F., the temperature of the bulb will be in the vicinity of 600° F., an air duct extending through one of the oven walls and communicating with the said shield, and blower means for moving ambient air through the duct and into the shield for cooling the bulb, said blower means being energized when the oven air temperature approaches its maximum predetermined temperature and the heating means is de-energized, whereby the bulb is quickly cooled down so that the control system will re-energize the heating means before the temperature within the oven cavity drops appreciably, and means for alternately cycling the heating means and the blower means so as to obtain a substantially constant maximum temperature within the oven cavity for a predetermined length of time.

6. A high temperature domestic oven having an oven cavity formed by a box-like oven liner and an access door, heating means for supplying heat to the cavity, a hydraulic thermostatic control system for governing the said heating means, the control system including a thermostat bulb located within the oven cavity, means for protecting the bulb from the heat within the oven so that the bulb temperature is caused to be lower than the oven air temperature and is an analog thereof, the heating means cycling off when the oven air temperature approaches a predetermined maximum amount, and blower means alternating with the heating means to cycle on and quickly cool the thermostat bulb so that the heating means will cycle with a low temperature gradient to produce a substantially constant maximum oven temperature for a predetermined length of time.

7. A high temperature domestic oven as recited in claim 6 wherein a shield is placed over the bulb to isolate the bulb from the oven cavity, and the blower means connects the shield to the exterior of the oven so that ambient air may be forced to flow over the bulb whenever the heating means is cycled off.

8. A high temperature domestic oven as recited in claim 7 wherein a heat sink means extends through one wall of the oven and is in engagement with the bulb for drawing off heat from the bulb to insure that the bulb temperature is a lower analog of the oven air temperature.

References Cited in the file of this patent

UNITED STATES PATENTS

| | | |
|---|---|---|
| 3,015,712 | Dills | Jan. 2, 1962 |
| 3,027,444 | Weeks | Mar. 27, 1962 |

FOREIGN PATENTS

| | | |
|---|---|---|
| 667,171 | Great Britain | Feb. 27, 1952 |
| 732,120 | Great Britain | June 22, 1955 |